Aug. 11, 1936. H. D. FORSE Re. 20,060

METHOD OF AND APPARATUS FOR PRESSING

Original Filed June 3, 1932 2 Sheets-Sheet 1

Inventor
Harry D. Forse
By Smith, Finchley & Fairbairn
Attorney

Aug. 11, 1936. H. D. FORSE Re. 20,060

METHOD OF AND APPARATUS FOR PRESSING

Original Filed June 3, 1932 2 Sheets-Sheet 2

Inventor

Harry D. Forse

By Smith Carlisle & Gardiner

Attorney

Reissued Aug. 11, 1936

Re. 20,060

UNITED STATES PATENT OFFICE 20,060

METHOD OF AND APPARATUS FOR PRESSING

Harry Donald Forse, Anderson, Ind.

Original No. 1,888,163, dated November 15, 1932, Serial No. 615,224, June 3, 1932. Application for reissue November 9, 1934, Serial No. 752,290

32 Claims. (Cl. 38—15)

This invention is a method of and apparatus for pressing, ironing, or otherwise shaping or forming articles, particularly articles of apparel, wherein the article is subjected to pressure between two relatively movable pressure members.

In the art of pressing, ironing, or otherwise forming or shaping articles of apparel wherein two relatively movable pressure members are employed and the article is positioned between said member during the pressing operation, there are two essential factors which have a vital bearing on the success and perfection of the operation. These factors are uniform heat and uniform pressure.

The prior art has developed satisfactory methods and apparatus for maintaining substantially uniform heat or temperature of the pressing members, but difficulty is still experienced due to the lack of proper apparatus or method for insuring a uniform pressure throughout the entire surface of the pressure members. Numerous attempts have been made to solve this particular problem by padding the working faces of one or both pressing members or by employing other types of yielding working faces for these members, but due to inherent characteristics of the structures previously proposed, none of them has provided the degree of uniformity, as to pressure that is desired.

This is particularly true of the so-called collar and cuff machines wherein the relatively movable pressing members have a marked degree of curvature. In machines of this type there are always certain portions of the surfaces of the pressing members wherein no substantial degree of pressure is exerted and at these portions the pressing or ironing operation is very unsatisfactory, generally resulting in a more or less "rough dry" appearance of the article.

With these facts in mind the present invention provides a method of and apparatus for pressing, forming or otherwise shaping articles of apparel and the like in a manner such as to insure a uniform pressure throughout the working faces of the pressure members irrespective of whether said members are substantially plane members or are provided with faces having substantial curvature.

The invention has also for its object the provision of a method and means for maintaining the fabric face of one or both pressing members substantially dry and to dispel the moisture accumulating therein from a dampened garment during the pressing operation.

Another object of the invention is to provide in an apparatus of the type described a substantially slack outer covering for one or both of the pressing members in combination with means for maintaining said slack covering smooth and devoid of wrinkles at all stages of the pressing operation.

Another object of the invention is to provide an apparatus capable of quickly and uniformly performing pressing or ironing operations in a manner proposed by my improved method.

These and other objects of the invention will become apparent from the following specification read in connection with the accompanying drawings wherein is illustrated a preferred embodiment of my improved apparatus.

Figure 1:
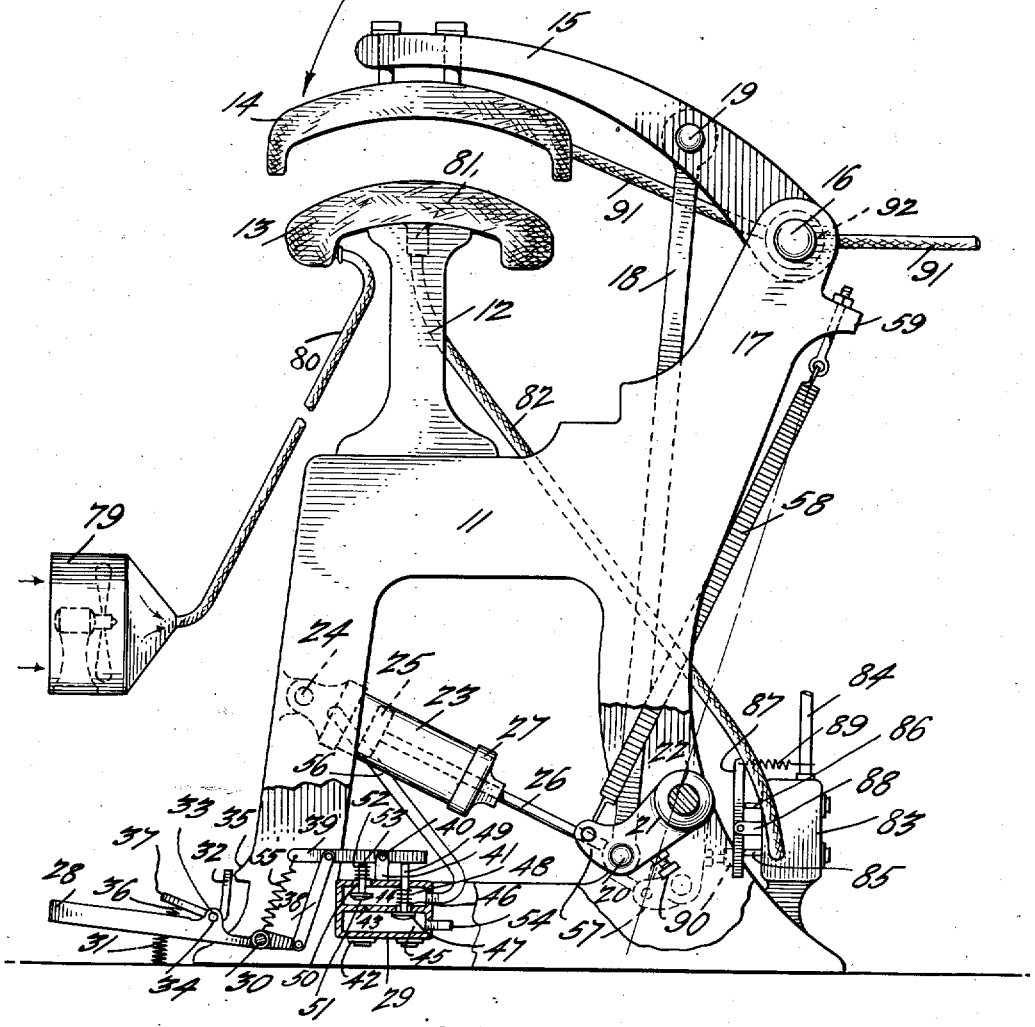
Fig. 1 is a side elevation of my improved apparatus with parts thereof in the normal position and with portions thereof broken away to expose normally concealed parts.

Broadly stated, my improved method comprises positioning or supporting an article to be pressed between two relatively movable pressing members, one or both of which may be heated, relatively moving said pressure members so as to contact opposite faces of the article and then developing pressure between the pressing members while maintaining the same relatively fixed with respect to each other. With this in mind considering Fig. 4 of the drawings, 1 designates a suitable base member upon which is supported a pressure member 2. The members 1 and 2 are relatively fixed with respect to each other and are designed to cooperate with a relatively movable presser member 3 pivotally supported at 4 by any suitable means and normally urged away from the members 1 and 2 by suitable spring means 5. The member 3 may be maintained in operative position with the members 1 and 2 and against the upward urge of the spring 5 by means of a suitable strut 6 pivotally supported at 7. Either or both of the members 2 and 3 may be heated by supplying the heated fluid thereto through the connections 8 and 9. In operation, an article to be pressed, such as indicated at 10, is positioned on the upper face of the member 2 the member 3 then brought into contact with the upper exposed face of said article and maintained in said position against the upward urge of the spring member 5 by the pivoted strut 6 as shown. Fluid under pressure is then admitted by way of the fitting 8 in order to slightly expand the member 2 in a vertical direction in order to place a substantial and uniform pressure on the article 10, it being understood that the member 2 by reason of its slight expansibility will create a uniform pressure on the article against the lower face of the pressing member 3, said member being restrained against upward movement by the strut 6.

Figure 4:
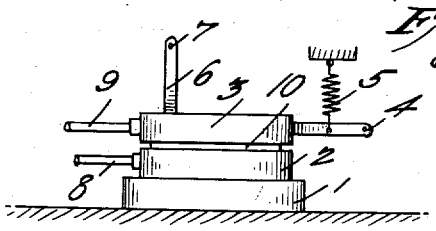
Fig. 4 is a diagrammatic view of a basic conception of the present method and apparatus.
Figure 2:
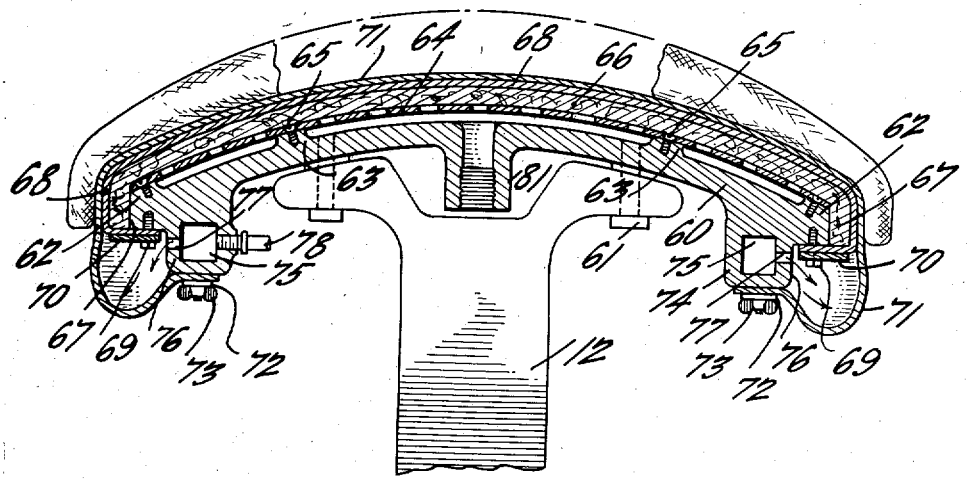
Fig. 2 is a fragmental sectional view of the stationary pressing member or buck of my apparatus showing the relative position of the parts when the movable pressing member or head is in operative engagement with the stationary member.
Figure 3:
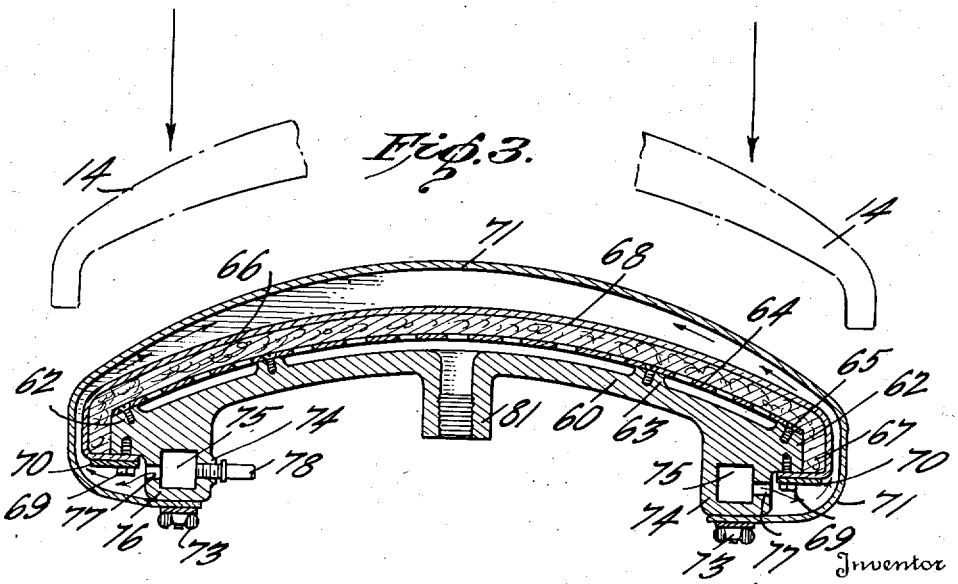
Fig. 3 is a fragmental sectional view similar to that shown in Fig. 2, but with the buck and head in their spaced or open position and showing the relative position of the cover member of the stationary pressing member during the drying thereof.

While Fig. 4 illustrates the basic principles of my method and apparatus, I have shown in Figs. 1, 2 and 3 a more practical conception of my invention and one capable of practical commercial adaptation. Referring more particularly to these figures of the drawings, I have shown in Fig. 1 a machine comprising a base frame 11 on which is supported a standard 12 carrying at its upper end the relatively fixed pressing member or buck of my apparatus which is indicated generally by the reference character 13. Cooperating with the relatively fixed pressing member 13 is a relatively movable pressing member or head indicated generally by the reference character 14. The pressing surface of the head 14 includes depending side pressing portions extending substantially parallel to the path of movement of the head with respect to the buck and these depending portions cooperate with similarly positioned portions on the buck in a manner to be hereinafter described. The relatively movable pressing member 14 is carried at the outer free end of a lever 15 pivoted at 16 to an upstanding portion 17 of the frame 11. The lever 15 with the relatively movable pressing member 14 is moved to and from operative engagement with respect to the stationary pressing member 13 by a power operated link 18 pivotally connected at its upper end 19 to the lever 15 intermediate the ends of the latter. The lower end of the link 18 is connected to a pin 20 of a crank 21 pivotally connected as at 22 to opposed portions of the frame member 11 adjacent the base portion thereof.

The power mechanism for operating the link 18 and the crank 20 comprises a power cylinder 23 pivotally connected at 24 to the frame member 11. Slidably mounted within the power cylinder 23 is a piston 25 carrying a piston rod 26 which extends through the lower head 27 of the power cylinder 23 and is connected to the crank pin 20 for partially rotating the crank about its center 22. For the purpose of controlling the admission and exhaust of motive fluid to the cylinder 23 a treadle mechanism 28 is provided for operatively controlling a valve mechanism generally indicated by the reference character 29.

The treadle mechanism 28 is pivoted intermediate its ends to one portion of the frame 11 as at 30 and is maintained in a normally elevated position by suitable means such as spring 31 interposed between the treadle 28 and the supporting plane for the machine. In order to lock the treadle mechanism in depressed position against the tension of the spring 31 I provide a suitable latch member 32 pivotally connected as at 33 to a lug 34 carried by the treadle 28. The latch or trigger 32 is maintained yieldably urged against a locking shoulder 35 carried by the frame member 11 by a suitable spring 36 positioned between the treadle portion 37 of said latch and the upper face of the power treadle 28.

The opposite or inner end of the treadle member 28 is connected by a link member 38 to a valve operating lever 39 pivoted intermediate its ends as at 40 to an upstanding lug 41 carried by the valve mechanism 29. The valve mechanism 29 comprises a casing 42 having a partition 43 which divides the casing into two compartments 44 and 45. The partition 43 is provided with a port 46 with which a valve member 47 cooperates and which is maintained in a normally closed position by means of a spring member 48 mounted upon the stem 49 of said valve. The upper wall of the casing 42 is provided with a port 50 leading from compartment 44 of the casing to the atmosphere and this port is controlled by a valve member 51 which is maintained in a normally closed position by means of a spring 52 mounted on the stem 53 of said valve. A motive fluid under pressure is admitted to the compartment 45 of the valve mechanism by means of the fitting 54. The valve operating lever 39 is positioned to engage the upper ends of the valve stems 49 and 53 and is urged into position such that the valve member 51 is maintained, against the urge of its spring 52, in a slightly open position, with the valve 47 closed. This is accomplished by means of a spring member 55 tensioned between the outer end of the lever 39 and a fixed part of the frame member 11 in a manner such as to urge the outer end of said lever downwardly as shown in Fig. 1. From this description of the valve mechanism and treadle mechanism it will be seen that when the treadle 28 is depressed the link 38 is urged upwardly with the result that the lever 39 is carried away from the upper end of the valve stem 53, allowing the valve 51 to close while simultaneously the other end of said lever depresses the valve stem 49, thereby opening valve 47 to allow motive fluid from compartment 45 to enter the power cylinder 23 through the conduit 56. This urges the piston 25 into the lower end of the cylinder 23 with the result that the crank 21 is rotated downwardly to exert a pull on the link 18 which brings the movable pressing member 14 into operative engagement with the stationary pressing member 13. In this position of the parts the trigger or latch 32 moves beneath the locking shoulder 35 under the urge of the spring 36 and prevents the treadle 28 from rising under the urge of the spring member 31. The crank 21 and the throw of the power operated piston are such that the crank is in a lower dead center position when the movable head of the press is in operative engagement with the buck. When the pressing operation has been completed a slight tap of the toe on the trigger release treadle 37 moves the trigger 32 from engagement with the shoulder 35 and the power treadle 28 rises under the urge of the spring 31 to restore parts of the valve mechanism 29 to the position shown in Fig. 1, in which the air or other motive fluid from the cylinder 23 will exhaust through the open port 50.

In order to restore the lever 15 and the movable pressing member 14 to an elevated position the crank 21 is provided with a lateral extension 57 carrying a pin to which is connected a powerful coil spring 58, the opposite end of said spring being connected to a lug 59 carried by the arm 17 of the frame 11. Thus when the motive fluid is exhausted from the cylinder 23 the spring 58 functions to raise the crank 21 and consequently exert an upwardly directed force on the link 18, which raises the lever 15 and the pressing member 14 to the position shown in Fig. 1.

In order to provide substantially uniform pressure between the relatively movable pressing members 13 and 14, I have devised an improved and novel head for one or both of the pressing members. In the accompanying drawings I have illustrated these improvements as applied to the stationary head or buck of my apparatus, but it is understood and will be apparent from the following description that the improvements are such that they may be associated with either or both of the pressing members of the machine when and if desired.

Referring to Figs. 2 and 3 of the drawings, I have shown in section structural details of my improved pressing head. The stationary pressing head indicated generally by the reference character 13 in Fig. 1 comprises a rigid base or restraining member 60 which is secured by lag screws or the like 61 to the standard 12 of the machine, as shown in Fig. 1. The base or restraining member 60 may be of any desired shape and dimension corresponding to the character of the work to be operated upon, and is shown as being provided with an upstanding flange 62 which extends completely round the outer edge thereof. The upper face of the base or restraining member 60 is provided with spaced lugs on studs 63 which are of the same height or which extend above the surface of the member 60 an extent corresponding to that of the flange 62. The flange 62 and the pins or studs 63 cooperate to support a perforated plate 64 which is firmly secured to the base 60 by means of screws or the like 65 threaded into the studs 63 and the flange 62. As shown in Figs. 2 and 3, the screws 65 are preferably countersunk in order to maintain a substantially even upper surface for the perforated plate 64.

The perforated plate 64 is covered to a substantial thickness with a soft padding material such as indicated at 66, said padding being distributed over said plate in a substantially even layer, it being noted that the padding is preferably carried down over the vertical side faces 67 of the restraining base 60. The padding 66 just referred to is maintained in position by means of a flexible impervious sheet 68 extending completely across the member 60 from side to side and from end to end thereof, said sheet being secured to the under surface of the member 60 by any suitable means such as the cap screws 69 and cooperating plate or flange member 70. It will be noted that the plate or flange member 70 is dimensioned to extend laterally of the edge of the restraining member 60 to support the padding 66 and the sheet member 68 for a purpose to be more particularly referred to hereinafter.

For purposes to be hereinafter explained more fully, the member 68 is a flexible sheet of material which is impervious to air and water and may conveniently be a closely woven fabric impregnated or otherwise treated to render the same impervious to air and water.

The impervious sheet member 68 is preferably covered by an outer covering sheet 71 which may be of cotton duck or the like, and while I have for purposes of conveniences and simplicity of illustration, shown this cover in the drawings as comprising a single thickness of material, it is to be understood that this member may comprise one or more inner layers of soft flannel or the like and an outer layer of cotton duck such as is conventional in pressing and ironing machines. The cover member 71 is, as shown, dimensioned so as to provide an appreciable slackness when mounted upon the stationary presser member of my apparatus and may be secured to the under face of the member 60 in any suitable manner such as by plates 72 and cooperating bolts and wing nuts 73.

Due to the slackness of the cover member 71 just referred to, it is desirable to provide means for maintaining said cover member in an unwrinkled and substantially smooth condition at all times, and also I find it desirable to the end that more perfect work may be accomplished by the machine, to provide means for maintaining this outer cover member substantially dry at all times. For this purpose I provide the restraining member or base 60 on its under face with a peripheral or annular rib 74 which is longitudinally cored throughout its length as shown at 75. The outer wall 76 of the rib 74 is provided with a series of perforations 77 communicating with the enclosed space defined by the cover 71. This arrangement is clearly shown in Figs. 2 and 3 of the drawings. Into the cored rib 74 I direct a drying fluid by means of the connection 78 and I have found it convenient to employ a continuously operating air fan or blower 79, which as shown in Fig. 1, may be conveniently associated with the connection 78 by means of a conduit 80. Thus it will be seen that the air entering the cored rib 74 finds its way be means of the perforations 77 into the space confined by the outer cover member 71 so that when the movable pressing member of my apparatus is elevated as shown at Fig. 3, said air functions to distend the cover member 71 throughout its entire extent, and such air passing relatively freely through said cover member tends to maintain the same substantially dry at all times. Furthermore, it will be seen that this same air, continuously permeating the cover member and maintaining it in a distended position, will function, when the movable pressure member is associated with the fixed pressure member, to draw the slackness of said cover to the outer edge of the head as shown in Fig. 2. This operation functions to maintain said cover member substantially smooth and free from wrinkles at all time.

A further feature of novelty of the present invention resides in the means I have devised for developing pressure between the relatively movable pressing members and an article positioned therebetween. Heretofore it has been customary to develop such pressure by power means arranged to move the relatively movable pressing members forcibly together. In other words, the pressure in the prior machines with which I am acquainted has been developed by moving the pressure members relative to one another an extent sufficient to develop substantial pressure on the article by movement of the members. Contrary to prior practice in this respect I propose to position my relatively movable presser members in contact with the opposite faces of an article to be pressed while exerting little or no pressure, and then maintain said members in such position and, while restraining them against separation, develop a substantially uniform pressure between one of said members and the article to be operated upon, and in a direction toward the other of said members.

With this in mind it is to be noted that I provide means for distending or expanding the working face of one or both of my pressing members and, as shown particularly in Figs. 2 and 3 of the drawings, the base or restraining member 60 is provided with a nipple 81 communicating with the interior of the space defined by said base member 60 and the impervious sheet or cover member 68. The nipple 81, as shown in Fig. 1, is connected by means of a suitable conduit 82 and valve mechanism 83, to a source of fluid pressure connected to a pipe line 84 and connected to the valve mechanism 83. The valve mechanism 83 is similar in all respects to the valve mechanism 29 and comprises an inlet valve 85 and an exhaust valve 86 operable through means of a lever 87 mounted on a bracket 88 carried by the valve casing 83 and engaging the upper ends of the valve members 85 and 86. The lever 87 is maintained by means of a spring 89 in a position such that the valve 86 is slightly open and is moved against the tension of said spring into a position to allow said valve to close and to simultaneously open valve 85 by means of a set screw 90 adjustably carried by the crank member 21. As shown in Fig. 1, the relative positions of the crank 21 and the pin 91 and valve operating lever 87 are such that when the crank member 21 is in its lower dead center position, in which position the lower working face of the upper relatively movable member of my pressing apparatus occupies a position in substantial coincidence with the surface defined by the outer cover member 71 when the latter is in contact with the inner impervious cover member 68, as shown in Fig. 2, the set screw 90 contacts with the lever 87 to move said lever into such position that the exhaust valve 87 is closed and the inlet valve 85 is opened. Thus, motive fluid such as air under pressure is admitted into the interior of the lower stationary pressing member and tends to slightly distend the cover member 68. Thus it is seen that after the relatively movable pressing members of my apparatus have been associated in a manner such as to contact on opposite faces of an article to be pressed, I expand or distend the working face of one or both of said pressing members without relatively moving said members, and while maintaining said members relatively fixed. In this manner the fluid pressure admitted through the nipple 81 functions to uniformly exert a substantial and yielding pressure over the entire working face of the pressure members. This is of the highest importance due to the fact that it inherently provides the same degree of pressure on all portions of the working faces or depending side pressing portions even on the substantially vertical faces of the pressing members in the region of the vertical face 67 of the member 60. In all prior machines known to me it has been impossible to develop in the region corresponding to the one just designated, a proper and uniform pressure or one such that would yield a smooth and wrinkle-free pressing operation.

When the pressing operation has been completed and it is desired to remove the article from the press the treadle mechanism 28 is operated in the manner heretofore described which results in the crank 21 and its adjustable set screw 90 moving away from the valve operating lever 87 to open the exhaust valve 86 and close the intake valve 85. This relieves the pressure on the interior of the buck with the result that the movable head may be withdrawn without possibility of rupturing the flexible sheet 68. It will be noted that this operation is accomplished in the proper timed relation due to the adjustability of the set screw 90 and the fact that at the time the crank 21 begins its movement away from the valve operating lever 87, it is moving rapidly relatively to the speed of upward movement of the link 18. This design and arrangement of the parts insures the proper timed operation of the valve operating lever 87 both in opening and closing movements of the press.

While either or both of the pressing members of my machine may be heated, I find it convenient and desirable to heat only the upper or relatively movable member of the machine and this may be accomplished in any conventional manner such as by leading to the interior of said member steam or other heating fluid. In Fig. 1 I have shown a heating fluid conduit 91 to which the fluid may be supplied to the head 14 through a conventional hinged joint 92.

Referring to the purpose and function of the extended plate or flange 70 associated with the means by which the impervious sheet is secured to the under face of the buck 60, it will be seen that these plates extending laterally to support the padding 66 and impervious sheet 68, function also to prevent rupture or puncture of the sheet when air is admitted to the interior of the stationary head, it being noted that if these portions of the sheet were left unsupported, the pressure within the fixed head would be unresisted at these portions during the pressing operation.

Another important feature of the present invention resides in the fact that the repeated delivery of air to and exhaust of air from the interior of the buck maintains the padding material 66 in a fluffy and non-impacted condition. This insures a yielding pressing face on the buck at all times.

It will be understood from the foregoing description that the apparatus forming the subject-matter of the present invention is arranged and designed such that the relatively movable pressing members of the apparatus are movable into a position in which they contact an article positioned between them on opposite sides with but little or no pressure. The members are then relatively fixed in such position and by expanding or distending the working face of one or the other of said members, pressure is developed within and between the otherwise fixed pressing members. In order to accomplish this operation the flexible impervious sheet 68 must be capable of slight expansion or distension when air is admitted to the interior thereof and this may be provided by making the sheet inherently slightly extensible or fitting said sheet over the soft padding 66 snugly but in a manner to leave a slight degree of slackness therein.

It is preferable to provide a very slight degree of slackness in the sheet 68 so that when pressure is applied to the interior of the buck with the movable pressing head in operative pressing engagement therewith, the relation and operation of the members is similar in all respects to that of an inner tube within a tire casing.

From the foregoing description read in connection with the accompanying drawings, it is apparent that I have provided an improved method of and apparatus for pressing, ironing or otherwise shaping or forming articles, particularly articles of apparel, wherein a substantial and uniform pressure may be developed over the entire moving face of relatively movable pressing members between which the article is positioned. Furthermore, the invention provides means for maintaining the outer covering of one or both pressing members substantially dry at all times and free of wrinkles. It is to be understood that while I have chosen to illustrate the invention as embodied in an ironing machine, neither the method nor the apparatus is restricted to such use, but are both generally applicable to ironing machines, pressing machines, and generally all forms of garment shaping and forming apparatus wherein relatively movable pressing members are employed for operating upon an article positioned between the same.

Having thus described my invention, what I claim as new and desire to secure by Letters Patent is:

1. In a pressing apparatus, a frame, a buck carried by the frame, an arm pivoted to the frame and overhanging said buck, a pressing head carried by said arm, means for rocking the arm on the frame and bringing the head into operative engagement with the buck including a crank shaft, means for rocking the crank shaft, a link connection between the crank shaft and arm, said buck being provided with an inner chamber having a substantially impervious distendable wall forming the working face of the buck, means for admitting fluid pressure to the buck to distend said working face, and means carried by said crank shaft for operating said last mentioned means in timed relation with respect to operation of the movable pressing head.

2. In an apparatus of the character described, a buck comprising a restraining base, a perforated plate mounted in spaced relation to the base, padding material mounted on said plate, an impervious sheet confining the padding material to said plate, a slack outer covering over said impervious sheet and secured to said base, means for admitting air to the space between the plate and base to distend said impervious sheet with respect to the base and means for admitting air to the interior of the space defined by said slack cover whereby to maintain the same distended and free from wrinkles, a relatively movable pressing head operatively associated with said buck and means for operating said head to place the same in operative engagement with the buck.

3. A buck for pressing machines comprising a base, a perforated plate mounted upon said base and defining a space between said plate and base, an extensible and substantially airtight cover member covering said plate and secured to the base, connection means whereby motive fluid may be delivered to the space within the buck defined by the base and perforated plate, an outer covering secured to said base and provided with an appreciable degree of slackness, and means for delivering air into the interior of the space defined by said slack outer cover member and the airtight cover member.

4. A buck for pressing machines comprising a restraining base provided with a peripheral flange, a perforated plate supported on said flange and defining an inner chamber between said plate and base, padding material mounted upon said plate, an impervious sheet covering said padding material and secured to the under side of the base, a slack outer covering mounted over said impervious sheet and secured to the under side of the base, said base being provided with an annular rib on its under face, said rib being longitudinally cored, passages leading from said core into the space defined by said slack cover, and means for admitting air into said cored rib for delivery to the space defined by said slack cover.

5. A buck for pressing machines comprising a restraining base provided with a peripheral flange, a perforated plate supported on said flange and defining an inner chamber between said plate and base, padding material mounted upon said plate, an impervious sheet covering said padding material and secured to the under side of the base, a slack outer covering mounted over said impervious sheet and secured to the under side of the base, said base being provided with an annular rib on its under face, said rib being longitudinally cored, passages leading from said core into the space defined by said slack cover, means for admitting air into said cored rib for delivery to the space defined by said slack cover, and means for delivering air to the space defined by the base and perforated plate whereby to distend said impervious sheet.

6. In an apparatus of the character described, a buck comprising a restraining base, a perforated plate mounted in spaced relation to said base, a substantially impervious sheet covering said plate and secured to the base, a slack outer covering over said impervious sheet and secured to the base, means for admitting air to the space between the plate and base to distend said impervious sheet with respect to the base, and means for admitting air around said sheet to the interior of the space defined by said slack cover whereby to maintain the same distended and free from wrinkles, a relatively movable pressing head operatively associated with said buck, and means for operating said head to place the same in operative engagement with the buck.

7. In an apparatus of the character described, a buck comprising a restraining base, a perforated plate mounted in spaced relation to the base, a substantially impervious sheet covering said plate, a slack outer covering over said impervious sheet and secured to the base, means for admitting air to the space between the plate and base to distend said impervious sheet with respect to the base, and means for admitting air around said sheet to the interior of the space defined by said slack cover whereby to maintain the same distended and free from wrinkles, a relatively movable pressing head operatively associated with said buck, means for operating said head to place the same in operative engagement with the buck, and means for controlling the flow of air to the space between the plate and base in timed relation to the operation of the press whereby said head and buck are in contact with each other prior to admitting air into said space.

8. A buck for pressing machines comprising a base, a perforated plate mounted upon said base and defining a space between the plate and base, padding material mounted upon said plate, an extensible and substantially air-tight sheet member covering said plate and padding material and secured to the base, and connection means whereby motive fluid under substantial pressure may be delivered to the space within the buck defined by the base and perforated plate.

9. A buck for pressing machines comprising a base, a perforated plate mounted upon said base and defining a space between the plate and base, an extensible and substantially air-tight pressing face for the base covering said plate and secured to the base, connection means whereby motive fluid under substantial pressure may be delivered to the space within the buck defined by the base and perforated plate, an outer covering secured to said base and provided with an appreciable degree of slackness, and means for delivering air under a substantially lower pressure around said pressing face into the interior of the space defined by said slack cover.

10. A buck for pressing machines comprising a base, padding material on the base, a slack outer covering mounted over said padding material and secured to the base, an air manifold having air passages discharging into the space defined by said slack cover and said padding material, and means for admitting air into said manifold for delivery to the space defined by said slack cover.

11. A buck for pressing machines comprising a restraining base, a perforated plate supported on the base and defining an inner chamber between said plate and base, a substantially impervious sheet covering said plate and secured to the base, a slack outer covering mounted over said impervious sheet and secured to the base, an air manifold having air discharge passages communicating with the space between said slack outer covering and said impervious sheet, means for admitting air into said conduit for delivery to the space defined by said slack outer cover and impervious sheet, and means for delivering air to the space defined by the base and perforated plate.

12. In a pressing machine of the character described, a buck comprising a base, a substantially impervious cover member secured to the base, a slack outer pervious cover member secured to the base, means for admitting air between the substantially impervious cover member and base to distend the cover with respect to the base, and means for admitting air to the space defined by the outer pervious slack cover and the impervious cover, said last mentioned air maintaining said outer slack covering ballooned and passing through it to dry the same.

13. In a pressing machine of the character described, a buck comprising a base, a substantially impervious flexible cover member secured to the base, means for delivering air under pressure between the base and the cover to distend the cover, a pervious slack outer cover secured to the base and overlying the impervious cover member, means for delivering air under pressure to the space between the pervious and the impervious cover members, a movable head cooperable with said buck and means for moving the head into operative engagement with the buck, the air admitted into the space between the pervious and impervious cover members ballooning the surplus material of the pervious cover member to the outer periphery of the buck as the movable head contacts the buck whereby to maintain said pervious cover member smooth and free from wrinkles.

14. A pressing machine comprising a buck including a base having depending side pressing portions, a flexible cover member secured to the base and enclosing said depending side pressing portions, a relatively movable pressing head cooperable with the buck and including depending side portions cooperable with the side pressing portions of the buck, means for operatively positioning the head relative to the buck, and fluid pressure means to distend the flexible cover member to exert a substantial and uniform pressure between the depending side pressing portions of the head and buck.

15. A pressing machine comprising a buck, a movable pressing head associated with the buck, means for moving the head into operative position with respect to the buck, said buck including a pressing surface having portions extending substantially parallel to the path of movement of the head to and from operative position with respect to the buck and said head including a pressing surface having portions opposed to the aforesaid pressing portions of the buck when the head is in operative position with respect thereto, a substantially impervious cover member enclosing the pressing portions of the buck, and fluid pressure means to distend said cover member transversely of the path of movement of the head and into pressing engagement with said head.

16. A pressing machine comprising a buck, a movable pressing head associated with the buck, means for moving the head into operative position with respect to the buck, said buck including a pressing surface having a portion extending substantially transversely of and other portions extending substantially parallel to the path of movement of the head, said head including a pressing surface having portions opposed to the aforesaid pressing portions of the buck when in operative position with respect thereto, a substantially impervious cover member enclosing the said portions of the pressing surface of the buck, and fluid pressure means to distend said cover member transversely of and parallel to the path of movement of the head whereby to create a substantially uniform pressure between said buck and head.

17. A pressing machine comprising a buck including a base having substantially horizontal and substantially vertical pressing faces, a flexible covering enclosing said pressing faces and secured to the base, a movable head member cooperable with the buck and having substantially horizontal and substantially vertical portions cooperable with the respectively horizontal and vertical portions of the buck, means for moving the head into operative position with the buck, and fluid pressure means for distending the cover member to exert a substantially uniform pressure on both the horizontal and vertical pressing faces of the head and buck.

18. A pressing machine including a pair of relatively movable pressing members, means for relatively moving said members into and out of pressing position, both of said members having cooperative pressing surfaces each of which includes a depending side portion, a cover member enclosing the depending side portion of one of said pressing members, and fluid pressure means operable when the members are in pressing position to distend said cover member to exert a substantially uniform pressure between the depending side portions of said pressing members.

19. The method of pressing which comprises supporting an article to be pressed, contacting said article on the unsupported face thereof, and simultaneously applying pressure to said article on substantially the entire supported face and subjecting said article to a stretching force to free the article of wrinkles.

20. The method of pressing which comprises supporting an article to be pressed, contacting said article on an exposed upper face, and simultaneously applying pressure to the article on the opposite under face thereof and subjecting said article to a lateral stretching force operating uniformly in all directions within the plane of the article to free the article of wrinkles.

21. A pressing machine comprising a pair of relatively movable pressing members, means for relatively moving said members into and out of pressing position, said members each having means defining cooperative pressing surfaces, each of said surfaces including a depending side portion, the means defining the depending side portion of one of said pressing surfaces being movable toward the depending side portion of the pressing surface of the other pressing member when said pressing members are in pressing position, and means for so moving said last mentioned means.

22. A pressing machine comprising a pair of relatively movable pressing members, means for relatively moving said members into and out of pressing position, said members each having means defining a pressing surface a portion of which lies in a substantially horizontal plane and another portion of which lies in a substantially vertical plane, the pressing-surface defining means of one of said members having portions movable respectively in substantially vertical and in substantially horizontal directions, and means for moving the movable portions of said pressing-surface defining means toward the horizontal and vertical portions respectively of the pressing surface of the other pressing member when said members are in pressing position, whereby to create a substantially uniform pressure between said pressing members.

23. A pressing machine comprising a pair of relatively movable pressing members, means for relatively moving said members into pressing position, said members each having a pressing surface extending in vertical and horizontal directions, means for distending the pressing surface of one of said members, said last named means being distensible in directions defined by both vertical and horizontal components, and means for supplying fluid under pressure to said distensible means when said members are in pressing position, whereby to creat a substantially uniform pressure between said pressing members in a plurality of planes.

24. In a pressing machine, a pair of relatively movable pressing members, means for holding said members in pressing position, and means for supplying heavy pressure to an article located between said pressing members, comprising an impervious distensible covering located upon the pressing surface of one of said members, said covering extending beyond the said pressing surface outside of the pressing zone thereof and there secured to said member, and means for distending said covering.

25. In a pressing machine, a pair of relatively movable pressing members, means for holding said members in pressing position, and means for supplying heavy pressure to an article located between said pressing members, comprising an impervious distensible covering located upon the pressing surface of one of said members, said covering being secured at its edges in a fluid-tight manner to said pressing surface outside of the pressing zone thereof, power means for bringing said pressing members into close proximity, and power means automatically operated when said pressing members are in close proximity to supply fluid pressure to distend said covering.

26. A pressing machine comprising relatively movable pressing members, power means for bringing said members substantially into contact with each other, means for supplying final heavy pressure to an article located between said pressing members comprising an impervious distensible covering secured in a fluid-tight manner at its edges to one of said members and means for supplying fluid under pressure to distend said covering, means for holding the pressing members in the contact position, and means whereby said fluid under pressure is supplied to said covering only after said pressing members are so held.

27. A pressing machine comprising relatively movable pressing members having body portions of generally complementary form, one thereof having marginal portions extending outwardly beyond the corresponding marginal portions of the other one of said body portions, beyond the zone of possible pressing engagement therewith of the other body portion, one of said pressing members having secured to its marginal portions the outer portions of a flexible impervious cover member which forms with it a pressure chamber, means for relatively moving said pressing members into juxtaposition and for holding them there, and means for supplying fluid pressure to said chamber to distend said cover member and thereby to apply the same with final pressure to the other complementary pressing member and to any work lying in the pressing zone.

28. A pressing machine comprising relatively movable pressing members having body portions of generally complementary form, one thereof having marginal portions extending beyond the zone of possible pressing engagement therewith of the other body portion, one of said pressing members having secured to its marginal portions the outer portions of a flexible impervious cover member which forms with it a pressure chamber, means for relatively moving said pressing members into juxtaposition and for holding them there, means for supplying fluid pressure to said chamber to distend said cover member and thereby to apply the same with final pressure to the other complementary pressing member and to any work lying in the pressing zone, and rigid means forming part of one of said pressing members and substantially bridging the gap between the opposite marginal portions of the two body portions and therefore preventing escape of said cover member from the pressing zone under full pressure conditions.

29. In a press of the class described, the combination of cooperating pressing members relatively movable into pressing position, means for causing said movement, said members having complementary main pressing surfaces and side pressing surfaces at an angle thereto, a flexible, stretchable and distensible substantially fluid-impervious pressing cover extending over and substantially conforming to the main and side pressing surfaces of one of said members, means for securing the free edges of said cover in fluid-tight manner to the said one member, means on said members for confining said cover against outward bulge or escape from the pressing zone between said side pressing surfaces when said members are in pressing position, and fluid means for distending said pressing cover into pressing engagement with the complementary surfaces of the other member.

30. In a press of the class described, the combination of cooperating pressing head and bed members relatively movable into pressing position, means for causing said movement, said bed member presenting a pressing surface upwardly and also having side surfaces at an angle thereto, said head member presenting a pressing surface downwardly for coaction with the pressing surface of the bed member, a flexible distensible cover member substantially conforming to said pressing surface and side surfaces of said bed member, means rigidly confining substantially all of said cover member against escape away from said side surfaces when said members are in pressing position, said last-named means including means for securing the free edges of said cover member in fluid-tight manner to said bed member, and fluid means for distending said cover member into pressing engagement with the coacting pressing surface of the head member.

31. In a pressing machine, a pair of coacting relatively movable pressing members, one of said members comprising chamber-forming means, a rigid support therefor, said means including a fluid-impervious flexible wall distensible into contact with the coacting pressing member when in pressing position, means for moving said members into and holding them in pressing position, and means controlled by movement of said members into pressing position for supplying and exhausting an easily compressible fluid under pressure to and from said chamber-forming means to extend the flexible wall thereof into contact with the coacting pressing members.

32. In a pressing machine, a pair of relatively movable pressing members having mutually coacting pressing surfaces, a flexible distensible cover member covering the pressing surface of one member and forming with said one member a pressure chamber, said cover member being distensible toward the other pressing member by pressure fluid in said chamber, said cover member extending beyond the margin of the pressing surface of said one member, means for relatively moving said pressing members into juxtaposition and for holding them there, means for supplying pressure fluid to said chamber for distending said cover member into pressure engagement with the coacting pressing member, and means rigidly secured to one of said pressing members and confining said cover member at substantially all points not engaged between said coacting pressing surfaces, whereby to prevent rupture of said cover member during a pressing operation.

HARRY DONALD FORSE.